United States Patent [19]

Grampp et al.

[11] 4,211,799

[45] Jul. 8, 1980

[54] METHODS FOR MAKING FLOCCULATION-RESISTANT CITRUS JUICE

[75] Inventors: Ekkehard Grampp, Egelsbach; Reinhold Schmitt, Zwingenberg; Helmut Uhlig, Rossdorf, all of Fed. Rep. of Germany

[73] Assignee: Röhm GmbH, Darmstadt, Fed. Rep. of Germany

[21] Appl. No.: 944,697

[22] Filed: Sep. 22, 1978

[30] Foreign Application Priority Data

Oct. 19, 1977 [DE] Fed. Rep. of Germany ......... 274688

[51] Int. Cl.$^2$ ................................................ A23L 2/30
[52] U.S. Cl. ......................................... 426/50; 426/51; 426/330.5; 426/423; 426/599
[58] Field of Search .................... 426/50, 51, 52, 599, 426/616, 330.5, 423, 495

[56] References Cited

U.S. PATENT DOCUMENTS

| 3,754,932 | 8/1973 | Baker et al. ........................ 426/330.5 |
| 4,109,017 | 8/1978 | Grampp et al. ........................ 426/51 |

OTHER PUBLICATIONS

Enzyme Topics, No. 3, May 1964, Rohm and Haas Co., Phila., Pa. (pp. 1–4).
Rohm and Haas Company data sheet on Pectinol 41-P concentrate.
Endo, Agr. Biol. Chem. 28, 535-542 (1965).
Purr et al., Biochemiche Zeitschrift, 329, 261-273 (1957).
Hultin et al., Archives of Biochem & Biophysics, 101, 396-402 (1963).
Food Science and Technology Abstracts (FSTA) vol. 3, Section 1 (1971).
Chemical Abstract, 81 48770a.

*Primary Examiner*—Raymond N. Jones
*Assistant Examiner*—Elizabeth A. Hatcher
*Attorney, Agent, or Firm*—Curtis, Morris & Safford

[57] ABSTRACT

The method of making citrus juice resistant to flocculation on storage, which method comprises treating naturally turbid citrus juice having a pH below 2.5 with a pectinase of the polygalacturonase-pectinesterase type at a temperature below 30° C. until the alcohol test for pectin is negative, and then decanting the flocculation-resistant supernatant juice after settling.

7 Claims, No Drawings

METHODS FOR MAKING FLOCCULATION-RESISTANT CITRUS JUICE

The present invention relates to methods for making citrus juice which is resistant to flocculation on storage.

Citrus juices are turbid by nature. The turbidifying materials are suspended by pectins, among other substances. The materials settle by themselves only very slowly and, also, cannot be filtered out. On long storage, the pectins hydrolyze under the influence of the acids and enzyme systems naturally contained within the juice and gradually lose their effect of stabilizing the turbidifying materials so that the latter settle. Because of this undesired settling, naturally turbid citrus juices are not suited for direct use after they have been in storage for long periods. To be sure the gross turbidifying materials can be largely separated by centrifugation. However, the formation of clouds or floccules occurs again after pasteurization if the juice is stored for a long time. This phenomenon can only be avoided by a complete clarification of the juice. To this end, the juice is preserved with sulfur dioxide, stored for several weeks, and decanted after settling of the turbidifying material. In this way, a clear juice is obtained which will not again become turbid or flocculent even on long storage and which is also suitable for the preparation of a concentrate, for example. However, this process is not very economical because of the considerable time required and the need for storage facilities.

Most naturally turbid fruit juices, including also citrus juices of only moderate acid content, can be clarified in a short time if the pectins which are native to the juice are enzymatically decomposed, the turbidifying materials are settled out, and the juice is filtered to clarity. This process fails for citrus juices having pH values below 2.5 since the activity of the usual pectinases is too small in the strongly acid region.

The object of the present invention is to impart a flocculation-resistant, storage-stable property to naturally turbid citrus juice having a pH value under 2.5 in a short period of time. This goal can be accomplished either by stabilizing the natural turbidity which is present so that it remains resistant to flocculation over long periods of storage or, on the other hand, by fully clarifying the juice in a short period of time. In both cases, a storage time of several months at room temperature should not generate the formation of clouds or floccules.

According to the present invention, both goals can be reached according to choice. Basic to the discovery is the recognition that strongly acid citrus juices contain two kinds of turbidifying materials having differing properties. One kind of turbidifying material is, as in other fruit juices, stabilized by pectins and precipitates if the pectins are decomposed. The second kind of turbidifying material is self-stabilized. Apparently, these latter turbidifying materials are carried along during the gradual settling out of the first-mentioned turbidifying materials upon self-induced pectin degradation.

Surprisingly, these turbidifying materials of the second kind are completely stable also in the absence of pectin if one removes the pectin-stabilized turbidities. In contrast, they can be flocculated out surprisingly easily by means of a silica sol, whereas this agent exercises no influence on the pectins-stabilized turbidities.

Thus, according to the invention one obtains a turbid, but flocculation-resistant, juice if naturally turbid citrus juice having a pH value below 2.5 is treated at a temperature below 30° C. with a pectinase of the polygalacturonase-pectinesterase type for a time until the alcohol test for pectin is negative and the juice is then decanted after settling. After this pectinase treatment, the pectin-dependent portion of the turbidifying materials separates by flocculation and, as for other juices, can be separated by decantation. The remaining turbidity is resistant to further flocculation.

A clear juice stable against subsequent turbidification is prepared by the post-treatment of the turbid juice so obtained with a silica sol in a manner which is described in more detail later herein.

According to the process of the invention, all strongly acid citrus juices having a pH value under 2.5 can be treated, such as lemon, lime, bergamot, and grapefruit juice, as well as the re-diluted juices obtained from the corresponding concentrates. Weakly acid citrus juices, for example orange juice, are also clarified according to the measures according to the present invention. However, such clarification can be carried out equally well with other pectinases and by modified procedural techniques.

The destabilization of the pectin-dependent portion of the turbidities is successfully carried out with pectinases of the polygalacturonase-pectinesterase type. These are characterized by a high pectolytic activity below pH 2.5. By "pectinase" is here intended the total enzyme complex produced by whatever microorganism is involved, which complex may possibly include accompanying enzymes which are essential for the total effect. Enzyme complexes of the type used according to the invention are obtained from mold fungus cultures, for example those of *Aspergillus niger*, *Aspergillus saitoi*, and *Aspergillus wentii*, or *Sclertonia libertiana*. A suitable commercially-available product is "Rohapect C" (Rohm GmbH). In contrast, the pectinases of the transeliminase type which are usually employed in the clarification of fruit juice, particularly for apple juice, are unsuited for the process of the invention. In contrast to known methods of pectinase treatment in which a visible destabilization of the turbid matter and the formation of clouds or floccules occur on pectin degradation, only a portion of the turbidifying materials are destabilized by the process of the invention. Since, after the separation of this portion, a considerable portion of the turbid material is still always present and, further, also does not separate further, the pectinase treatment according to the present invention cannot simply be compared with a conventional clarification method.

The method of the invention is also distinguished from conventional clarification methods in the conditions under which the enzyme acts. Whereas pectinases are mostly permitted to operate at 40° to 50° C. for one to two hours, a temperature of 30° C. may not be exceeded in the process of the invention. The preferred temperature is from 15° to 25° C. The period of activity is extended for such a time until the alcohol test for pectin is negative. In general, this requires at least four hours, preferably 12 to 24 hours. For the alcohol test, a sample of the juice is combined with an equal volume of ethanol. If a gel is still formed thereby, which gel floats, treatment is continued.

The amount of enzyme required is from 50 g to 200 g for 1000 liters of juice if the enzyme is of commercial quality having about 700 PGU/mg. Enzyme products having more than 700 PGU/mg are employed in a correspondingly smaller amount and vice versa.

[One PGU (polygalacturonase unit) of the enzyme is that amount which reduces the viscosity of 1 mg of pectin in a standard pectin solution by $1/\eta_{sp}=0.05$ in 40 minutes at 30° C. at pH 4.0. The standard pectin solution is made by mixing 0.71 g of pectin with 1 ml of ethanol and dissolving the mixture in water. After the addition of 20 ml of a citric acid buffer solution at pH 4.0, the solution is diluted to 100 ml and is filtered after standing for 12 hours. 15 ml of the solution contain 100 mg of pertin.]

The turbidifying portion which is destabilized by the pectinase treatment is separated in the usual fashion by decantation. This includes all conventional methods for the separation of the residue from the settled turbid material, for example also centrifugation. The use of sodium-calcium-bentonite (which is obtained from natural bentonite by a partial exchange of Ca-ions for Na-ions) as a decantation auxiliary is advantageous. The bentonite is employed in small amounts in the preparation of turbid citrus juices, for example 0.1 to 1 kg per 1000 liters of juice.

For a complete clarification of the enzyme-treated juice, Na-Ca-bentonite is added to the juice in a considerable amount, namely from 1 to 4 kg per 1000 liters of juice. Re-diluted concentrates can, for the most part, already be obtained in clear condition by filtration after further addition of a silica sol and a short period of standing. The amount of silica sol (calculated as a sol having 15% dry solids content) is about one half of the amount of bentonite. When treating native citrus juices, a period of at least a half hour, preferably at least a complete hour, should extend between the addition of the bentonite and that of the silica sol. In this period the juice should be stirred at least from time to time. As the silica sol, a product of the quality obtained by the hydrolysis of silicon tetrachloride in the vapor phase with subsequent dispersion in water is preferably employed. A typical product of this kind has a specific surface area of 170 m$^2$/g.

After this treatment, the floccules settle in 4 to 20 hours. The clear juice can be obtained by filtration without difficulty and is then suitable for the preparation of soft drinks, scents, candies, and the like. The juice can be concentrated from a value of, generally, 7°–9° Brix to about 70° Brix.

A better understanding of the present invention and of its many advantages will be had by referring to the following specific examples, given by way of illustration.

EXAMPLE 1

The juice is recovered from freshly-harvested lemons using a ball press. Coarse turbidifying particles and fibers are removed from the juice so obtained using a finisher. The juice contains demonstrable amounts of pectin. The juice temperature is about 20° C. 100 g of a pectinase preparation from *Asp. niger* (700 PGU/mg) are added to 1000 liters of juice and distributed well throughout. After a period of 20 hours, the pectin is decomposed and cannot be found employing the alcohol test.

Now, 4 kg of a sodium-calcium-betonite in completely swollen form are added and mixed in well. For one hour the settling bentonite is stirred briefly at 10 minute intervals.

Now, 2 liters of a 15% silica sol (commercially available as "Clarification Agent C") are added and mixed in well. A turbid flocculation occurs which compactly settles to the bottom in the following 10 hours. The remaining juice is clear and is drawn off. It is filtered and thickened to a clear concentrate in a vacuum evaporator at 50°–60° C.

EXAMPLE 2

Freshly pressed lemon juice with demonstrable amounts of pectin is freed of a portion of the turbidifying material by means of a centrifuge. Subsequently, 200 g of a pectinase preparation from *Asp. niger* (1000 PGU/mg) is added to 1000 liters of this juice at a temperature of 25° C. and mixed. After five hours operating temperature no pectin can any longer be found.

Now, 2 kg of a sodium-calcium-bentonite in the fully swollen condition are added and mixed well. During the following hour, the juice is stirred at 15 minute intervals. Subsequently, one liter of a 15% silica sol (commercially available as "Clarification Agent C") are added and mixed well.

The floccules which form are left to stand for one hour. In order to increase the adsorption effect for fine turbidity, the juice is briefly stirred once more and then again left to stand. After five hours of standing, the floccules have settled and the supernatant juice is clear. It is drawn off, filtered and thickened in a vacuum evaporator to form a clear concentrate.

EXAMPLE 3

Turbid, pectin-containing lemon juice concentrate of 35° Brix is rediluted with de-mineralized water to 8° Brix.

Treatment with pectinase and flocculating agents follows as in Example 2. However, the silica sol is added immediately after the bentonite is mixed in.

The clear filtered juice so obtained is worked up into a beverage, pasteurized, and bottled.

EXAMPLE 4

1000 liters of freshly-pressed lemon juice are freed of gross turbidifying materials with a finisher and de-pectinized at 15° C. with 200 g of a pectinase preparation from *Asp. wentii* (350 PGU/mg).

Subsequently, the turbidifying particles, destablized by the degenerated pectin, are removed using a centrifuge. Colloidally divided fine turbidifying material remains in the juice. After pasteurization and bottling, the juice remains homogeneously turbid and forms no precipitate during subsequent storage.

EXAMPLE 5

Pectin-free lemon juice prepared according to Example 4 is combined with 0.5 kg of pre-swollen sodium-calcium-bentonite per 1000 liters. The bentonite adsorbs a portion of the primary de-stabilized turbidity and settles within 10 hours. The slightly turbid supernatant juice is drawn off and pasteurized. After conversion into a turbid beverage, it is pasteurized and bottled. On storage, the beverage has no tendency to form floccules or a precipitate and remains homogeneously turbid.

What is claimed is:

1. The method of making citrus juice resistant to flocculation on storage, which method comprises treating naturally turbid citrus juice having a pH below 2.5 with a pectinase of the polygalacturonase-pectinesterase type at a temperature below 30° C. until the alcohol test for pectin is negative, adding sodium-calcium-bentonite to the juice as a decantation auxiliary after the pectinase treatment, and then decanting the supernatant juice after settling, whereby a flocculation-resistant stably-turbid juice is obtained.

2. A method as in claim 1 wherein said pectinase treatment is carried out for at least four hours.

3. A method as in claim 1 wherein 0.1 kg to 1 kg of sodium-calcium-bentonite is added per 1000 liters of juice.

4. A method as in claim 1 wherein 1 kg to 4 kg of sodium-calcium-bentonite is added per 1000 liters of juice.

5. A method as in claim 4 wherein a silica sol is added to the juice after addition of the sodium-calcium-bentonite and prior to decanting the juice.

6. A method as in claim 5 wherein at least one-half hour elapses between addition of the sodium-calcium-bentonite and the silica sol, during which the juice is stirred at least from time to time.

7. A method as in claim 5 wherein said silica sol is one prepared by dispersing in water silica obtained by the vapor phase hydrolysis of silicon tetrachloride.

* * * * *

UNITED STATES PATENT AND TRADEMARK OFFICE
CERTIFICATE OF CORRECTION

PATENT NO. : 4,211,799
DATED : July 8, 1980
INVENTOR(S) : Ekkehard Gramp et al.

It is certified that error appears in the above-identified patent and that said Letters Patent are hereby corrected as shown below:

On the cover page, left-hand column, item [30], the correct serial number of the German patent application filed October 19, 1977 is --2746884--.

Column 6, line 3, after "juice" insert --, whereby the otherwise stably-turbid juice is clarified--.

Signed and Sealed this

Fourteenth Day of July 1981

[SEAL]

Attest:

GERALD J. MOSSINGHOFF

Attesting Officer

Commissioner of Patents and Trademarks